July 21, 1959  G. E. MALLINCKRODT  2,895,457
ROTARY ENGINE
Filed July 30, 1958  5 Sheets-Sheet 2

George E. Mallinckrodt,
Inventor.
Koenig and Pope,
Attorneys.

July 21, 1959 G. E. MALLINCKRODT 2,895,457
ROTARY ENGINE
Filed July 30, 1958 5 Sheets-Sheet 3
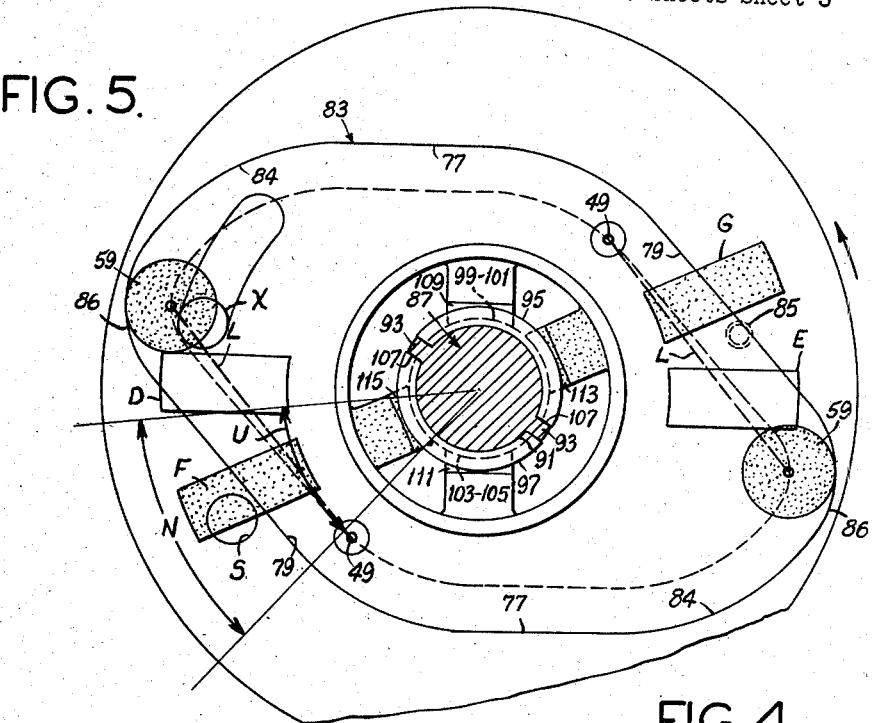
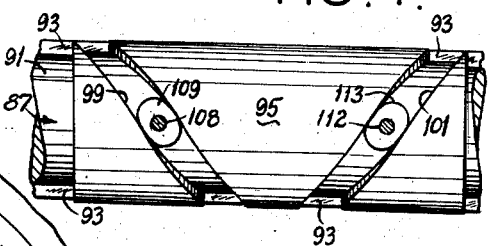
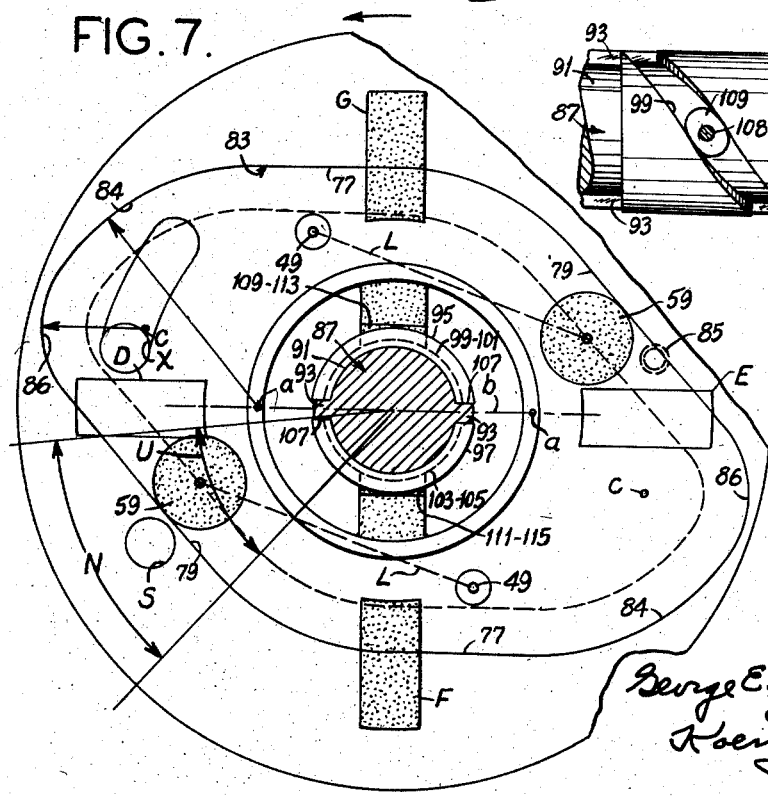
George E. Mallinckrodt, Inventor.
Koenig and Pope, Attorneys.

July 21, 1959 G. E. MALLINCKRODT 2,895,457
ROTARY ENGINE
Filed July 30, 1958 5 Sheets-Sheet 4

George E. Mallinckrodt,
Inventor.
Koenig and Pope,
Attorneys.

July 21, 1959 G. E. MALLINCKRODT 2,895,457
ROTARY ENGINE
Filed July 30, 1958 5 Sheets-Sheet 5

George E. Mallinckrodt,
Inventor.
Koenig and Pope,
Attorneys.

United States Patent Office 2,895,457
Patented July 21, 1959

2,895,457
ROTARY ENGINE

George E. Mallinckrodt, St. Louis, Mo., assignor to Elliot Enterprises, Incorporated, St. Louis County, Mo., a corporation of Missouri Application July 30, 1958, Serial No. 752,063

22 Claims. (Cl. 123—11)

This invention relates to rotary engines operating on an expansive gaseous medium and employing several reverse-locking rotors having multiple pistons interdigitated and operative in an annular or toroidal chamber. The invention comprises improvements upon prior engines of this type, as shown for example in my United States Patent 2,736,328, dated February 28, 1956.

Among the several objects of the invention may be noted the provision of an improved low-cost motion differentiating mechanism between the rotors and the engine drive shaft, in which connection there are no springs, gears or hydraulic fluids, such as heretofore known; the provision of a differentiating mechanism of the class described which may be built into a small radial space and transmit comparatively large driving loads with small wear; the provision of an improved reverse-locking mechanism for rotary engines of the class described, particularly of the type of engine having two pistons per rotor; and the provision of a reverse-locking mechanism of this class having a geometry adapted to produce a large angular range within which rotor reverse-locking may occur, thereby assuring greater operating stability of the engine over a wider range of speeds. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
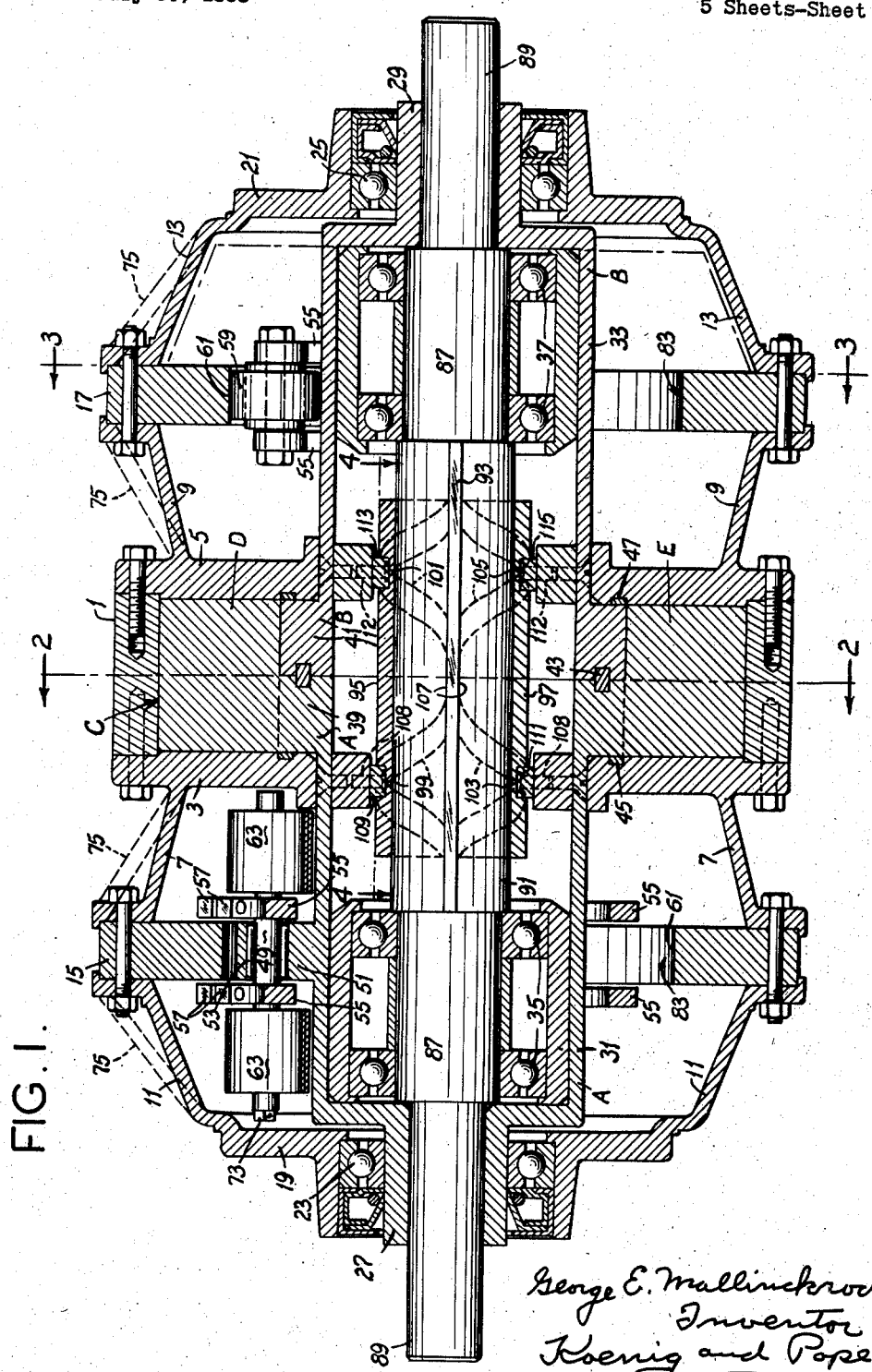
Figure 2:
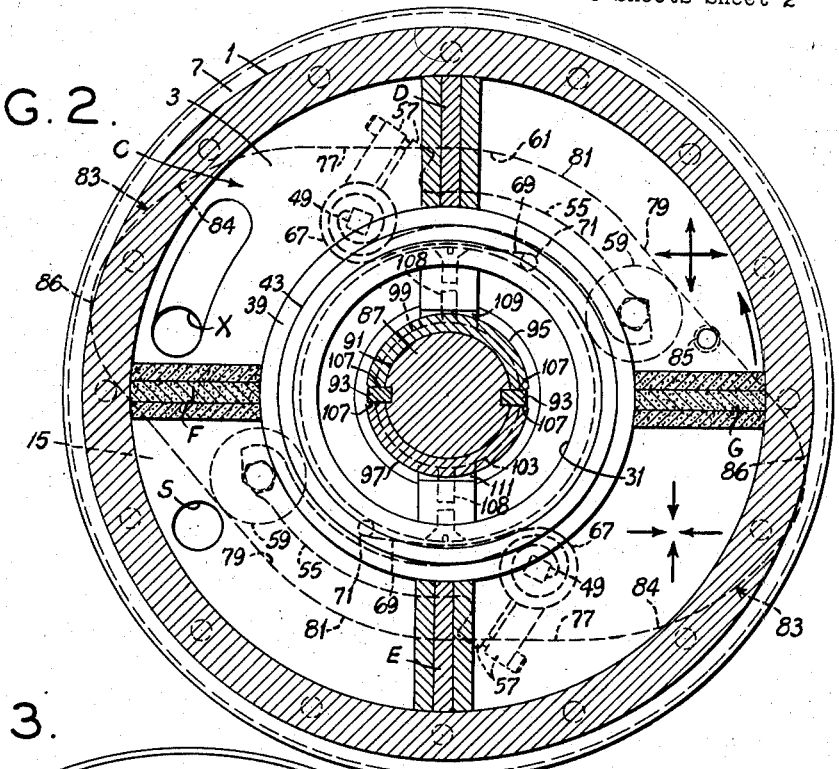
Figure 3:
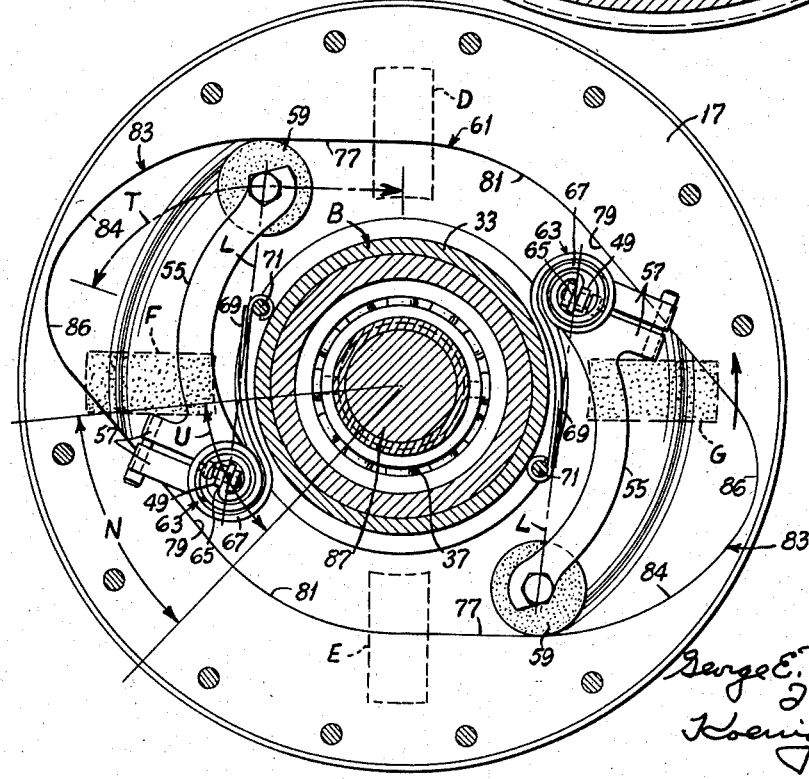

In the accompanying drawings, in which one of various possible embodiments of the invention is illustrated, Fig. 1 is a simplified axial section taken through the engine and viewed from the front, showing what is hereinafter referred to as a neutral position;

Figs. 2 and 3 are cross sections taken on lines 2—2 and 3—3, respectively, of Fig. 1;

Fig. 4 is a horizontal section taken on line 4—4 of Fig. 1;

Figs. 5, 7, 9 and 11 are diagrammatic end views showing a reverse-locking mechanism in successive positions (viewed from the same end of the machine as in Figs. 2 and 3), said Figs. 5, 7, 9 and 11 also showing corresponding end views of a motion-differentiating mechanism;

Figs. 6, 8, 10 and 12 are front elevation views of said differentiating mechanism in positions corresponding to those shown in Figs. 5, 7, 9 and 11, respectively; and, Figs. 6A, 8A, 10A and 12A are diagrammatic right-hand end views of Figs. 6–12, respectively, and illustrating diagrammatically the positions of correlated piston and motion differentiating parts.

Figure 6:
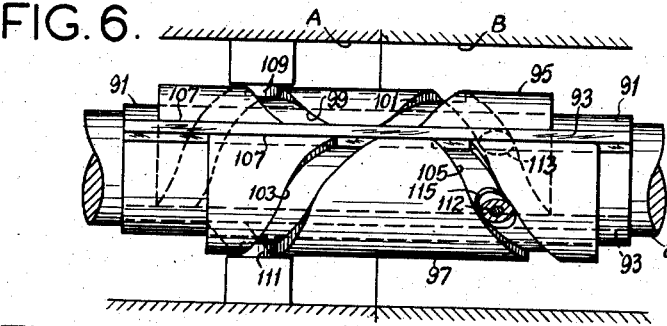
Figure 6A:
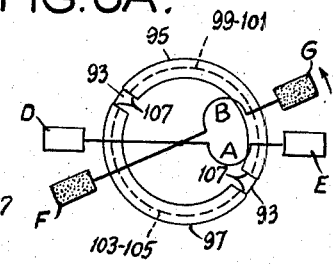
Figure 8:
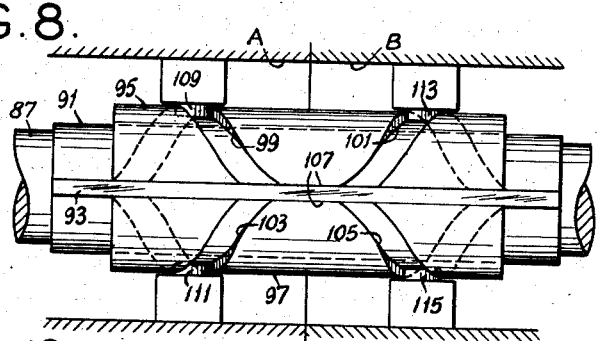
Figure 8A:
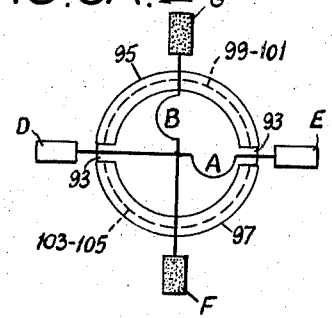
Figure 10:
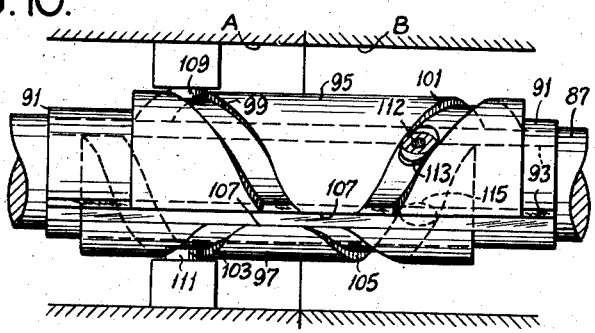
Figure 10A:
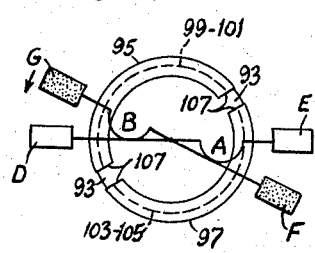
Figure 12:
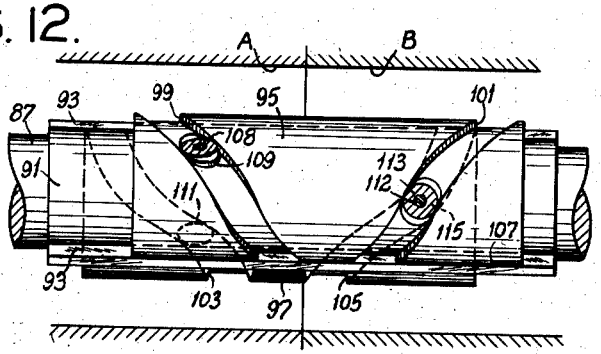
Figure 12A:
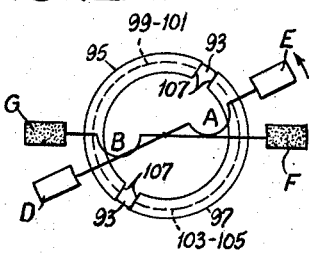
Figure 9:
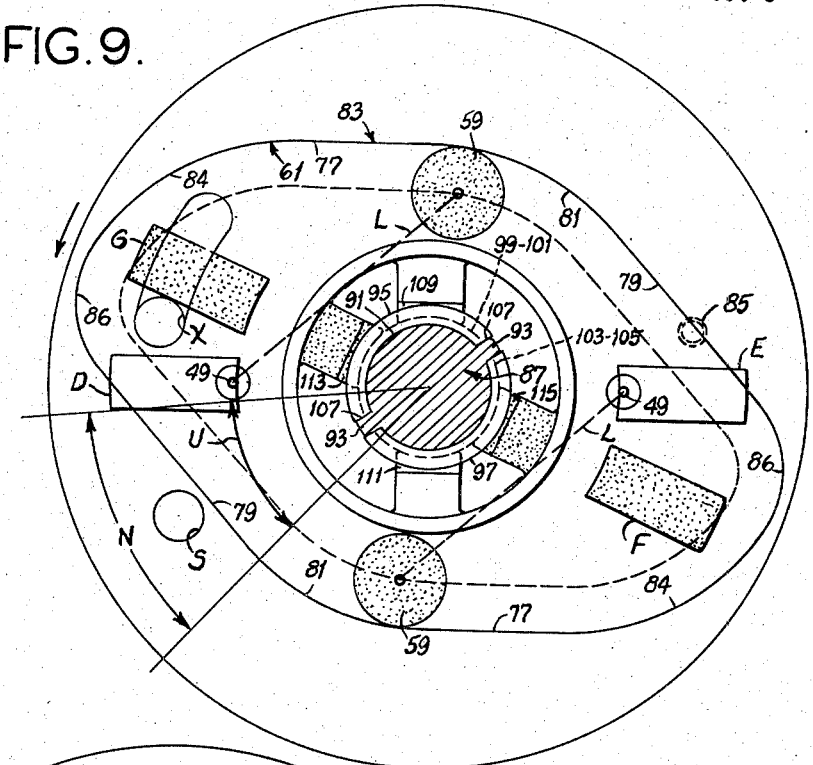

Thus the drawing figures are correlatively grouped as follows: Figs. 5, 6 and 6A; Figs. 7, 8 and 8A; Figs. 9, 10 and 10A; and Figs. 11, 12 and 12A, the order of these groups corresponding to certain successive operating positions.

Corresponding reference characters indicate corresponding parts throughout the several views of the drawings.

In the following, no structural details known to the art will be given, as for example details of piston rings and other sealing elements, lubrication systems, porting, ignition, carburetion and the like.

Stippling in the drawings is for convenient identification of operatively connected systems of parts and has no other significance.

Referring now more particularly to Fig. 1, there is shown at numeral 1 an outer cylinder ring to which side cheeks 3 and 5 are bolted. The cheeks 3 and 5 are parts of circular frame elements 7 and 9, respectively. Additional circular frame elements are shown at 11 and 13, respectively. Elements 7 and 11 are bolted to, and support therebetween, a cam track member 15. Elements 9 and 13 are also bolted to and support therebetween a cam track member 17. Heads 19 and 21 on the members 11 and 13, respectively, carry antifriction bearings 23 and 25, respectively. Hollow bosses 27 and 29 are rotatable in the bearings 23 and 25, respectively. These respectively form parts of rotors, which are indexed A and B in general.

Rotors A and B comprise sleeves 31 and 33, in which are located, respectively, the outer races of antifriction bearings 35 and 37. The inner ends of the sleeves 31 and 33 carry abutting rings 39 and 41 located between the cheeks 3 and 5, respectively. A running seal between the rings 39 and 41 is shown at 43. Cheek seals for the rings 39 and 41 are shown at 45 and 47, respectively. Thus an annular or toroidal cylinder C is formed by the ring 1, cheeks 3, 5 and rotor rings 39, 41.

Each of the rotors A and B carries two oppositely located pistons adapted to sweep through the cylinder C. The two pistons on rotor A are indexed D, E and those on rotor B are indexed F, G (Figs. 2 and 3). The pairs of pistons D, E and F, G are located at 90° with respect to one another in Figs. 1 and 2, which hereinafter will arbitrarily be called their neutral positions.

Between each rotor A and B and its respective cam track member 15 and 17 is a reverse-locking mechanism. Since these mechanisms are identical, the description of one will suffice for both and the same reference numerals will be used for each. Thus (Fig. 3 for example) each reverse-locking mechanism comprises oppositely located pivot pins 49, supported in needle bearings 53 upon opposite lugs 51 on rotor sleeve 31 or 33, as the case may be (see also the typical cross-sectional detail of one of these pivot pin supports at the left in Fig. 1).

At numerals 55 are shown pairs of arms on the lugs 51. These have split bolt-clamps 57 for clamping them to the respective pivot pins 49. Each pair of arms 55 acts as a single arm, one each being located on opposite sides of a lug 51. Between the ends of each pair of arms 55 is a follower roller 59. Pairs of these rollers are adapted to engage identical cam tracks 61 forming the insides of the members 15 and 17.

The two rollers 59 associated with rotor A bear upon the cam track 61 in member 15, and those associated with rotor B bear upon the cam track 61 in member 17. In order to maintain contact between the rollers 59 and the cam tracks 61, leaf springs 63 are employed, each having one end anchored in a slot in its pivot pin 49, as illustrated at 65. Each spring is coiled, as shown at 67, and has an arm 69 extending to an anchor pin 71 on its respective rotor. In order to tension the spring 63, the bolt-clamps 57 may be loosened and by means of a square head 73 each pin 49, the pin may be turned to tension the attached spring until the pressure of the corresponding roller 59 on the cam track is satisfactory. Then the clamps 57 are tightened. The result is that each arm 55 is biased in a direction (anticlockwise in Figs. 2, 3, 5, 7, 9 and 11) to bias the follower rollers 59 against the respective cam tracks 61.

Each arm 55 is curved, so that when swung inward it will clear its respective sleeve 31 or 33, as the case may be. In order to clear the ends of the arms 55 in certain phases of their cyclic actions (to be described below) the frame members 7, 9, 11 and 13 are provided with bulged portions, as indicated by the dotted lines 75 (Fig. 1), these for convenience having been rotated into the plane of the section of Fig. 1. It will be understood that these bulged portions are at the proper peripheral locations to provide the needed clearance required by the actions of the arms.

Each cam track 61 consists of two opposite flats 77 and two additional opposite flats 79, these being smoothly connected in pairs 77, 79 by short arcs 81 centered on the rotor center. The other ends of each pair of flats 77 and 79 are connected by compound curves 83. Each curve 83 has a large radius of curvature in its portion 84 extending from a flat 77 and centered at $a$ on a line $b$ parallel to flats 77. The portions 86 adjacent the flats 79 have a smaller radius of curvature centered at $c$ (see Fig. 7). Both cam tracks, as will be seen by comparing Figs. 2 and 3, have the same angular position in the engine frame. The cam track in member 15 is engaged by the reverse-locking mechanism which is connected with the rotor A on which are the pistons D and E (Fig. 2). The cam track in member 17 is engaged by the reverse-locking mechanism which is connected with rotor B on which are pistons F and G. Anticlockwise rotation of the rotors causes their respective follower rollers 59 to traverse the cam tracks 61 in an anticlockwise direction. During this process, the arms 55 move in and out relative to their respective rotors. In moving inward, they store potential energy in their respective springs 63. As the arms 55 move outward, this potential energy is delivered to the respective rotor as kinetic energy. An important feature consists in the range of angular rotor motion over which this energy is delivered, it being advantageous to have the range as great as possible. This range also should encompass within it the reverse-locked position of the rotor required for operation of the engine. For example, in the case of rotor B, its reverse-locked position occurs at or near the position shown in Fig. 3, wherein the effective thrust lines L of the arms 55 are near a perpendicular position relative to the flats 77. Perpendicularity need not be exact, because the springs 63 overcome any small component of thrust which might tend to fold the arms 55 inward upon reverse action.

The positions at which lines L are near perpendicularity with respect to the flats 77 lie well within a very long trajectory of the roll center, as indicated by a dot-dart T on Fig. 3. Each trajectory T subtends substantially the maximum inward and outward positions of a corresponding roll center. This trajectory is very long. The corresponding trajectory of the pivot center of the respective arm 55 is shown at U in Fig. 3. It subtends a large angle N of approximately 45°, throughout which potential energy is delivered from the respective spring 63 to the respective rotor as kinetic energy. This is a substantially greater angle for the purpose than has heretofore been available for a like purpose in any machine of this type. Its advantage will appear.

In cheek 3 is located a countersunk ignition device 85; also an exhaust port X and a suction port S. These may also be in the other cheek or duplicated in both cheeks 3 and 5. The positions of these determine the power functions of the engine. As indicated in Fig. 3, the reverse-locking linkages of rotor B are in reverse-locked position. Therefore, the pistons F and G (Fig. 2) attached to the rotor B are also in reverse-locking and horizontal positions, as shown in Fig. 2. An explosion event is proceeding between pistons D and G. Exhaust of spent gas from a former explosion event is occurring from ahead of piston D through the exhaust port X. Piston F on rotor B which now separates ports X and S is also being held in reverse-locked position because of the explosive expansion occurring between pistons D and G. Piston E is receding from piston F, thus drawing in a charge through the suction port. It also compresses a charge between it and the reverse-locked piston G.

The next power event is illustrated in Fig. 5, wherein compression between pistons E and G has increased and the explosion pressure has been dissipated by connection with the exhaust X. Therefore, the pistons F and G have been released from their reverse-locked positions and have been driven ahead by the gaseous collision process finally occurring between pistons E and G. Pistons D and E have moved into reverse-locked positions, as determined by the actions of their reverse-locking linkages, not shown on Figs. 5, 7, 9 and 11 but the actions of which are the same as those of the reverse-locking linkages above described. However, the reverse-locking linkages for pistons F and G are shown on Figs. 5, 7, 9 and 11 in order to trace out one complete cyclic of power action, which is sufficient, for both reverse-locking linkages operate the same. The reverse-locking linkage shown in Fig. 5 is not reverse-locked, as will be clear from the fact that the positions of the rollers 59 are at the ends of the curves 83.

The gas-buffered collision event occurs at maximum compression between the pistons E and G, as the former reaches the end of its approach to the latter when reverse locked. This initiates common movement of rotors A and B as a rigid connected system, connection being through the gas at maximum compression between their pistons E and G. The angle N is large enough to ensure that, over a wide range of positions on both sides of the reverse-locking position, the springs 63 are supplying energy to their rotors. This assures that the reverse-locking operation will occur without fail under a wide variety of operating conditions, thus stabilizing the operation of the machine under such conditions.

Referring again to Fig. 5, at or about the time that piston E reverse-locks, piston G has been carried beyond the ignition device 85, thus exposing the charge to ignition. Thus the ignition device 85 ignites the compressed charge between pistons G and E. This results in driving piston G anticlockwise relative to piston E and placing the reverse-locking linkage of rotor B so that thrust lines L are as shown in Fig. 7. The rollers 59 are at this time on the flats 79, wherein the springs 63 are rewound by inward movements of the arms 55. This draws upon the explosive energy applied to rotor B to produce potential energy in the springs, the springs being wound and loaded during the explosion event.

In Fig. 9, the explosion event between pistons G and E has exhausted itself, whereas the next succeeding gas-buffered collision event is starting between pistons F and E. At this time the rollers 59 belonging to rotor B, carrying pistons F and G, have transferred from the flats 79 to the flats 77. The springs 63 are about to start to convert potential energy into kinetic energy of rotation in rotor B throughout said 45°. In this interval between Figs. 9 and 11, the gas-buffered collision event occurs between pistons F and E and they, with their rotors, are carried along together. Due to said 45° angle of energy transfer, conditions are established for positive reverse-locking under widely varying kinetic conditions with attendant and superior operating stability.

Figure 11:
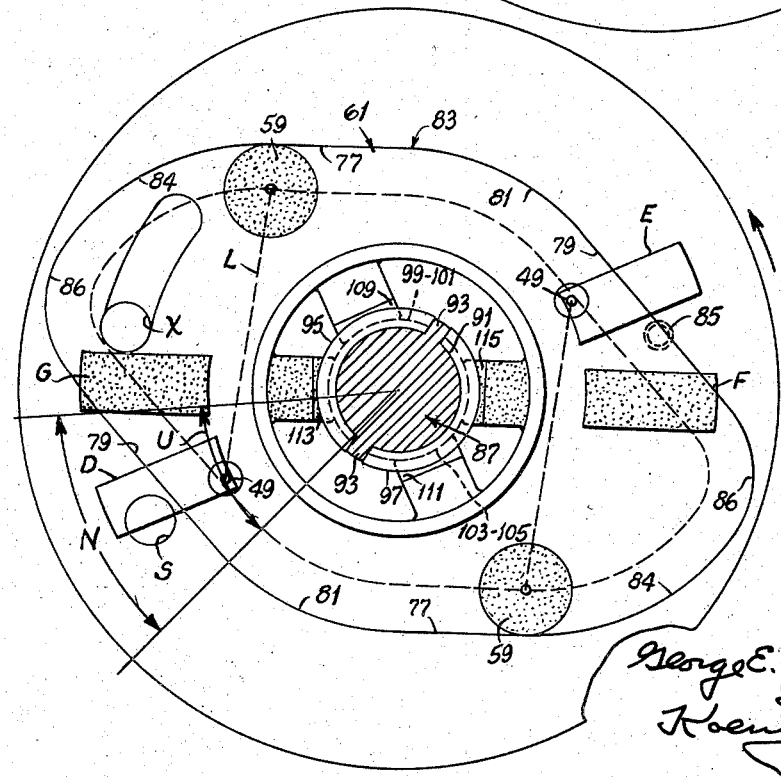

The progression of movement of the reverse-locking mechanism of rotor B, illustrated in succession in Figs. 5, 7, 9 and 11, occurs throughout a 180° movement of the rotor B. This involves one explosion and one cycle of power events, i.e., suction, compression, explosion and exhaust. This interchanges the pistons G and F at the reverse-locking position (Fig. 11). The same kind of action involving a second explosion (Fig. 11) will occur with regard to rotor A when rotor B is reverse locked, requiring no further description. On the other hand, a complete cycle of mechanical events for a complete rotation of both rotors involves four cycles of power events. The two pistons on each rotor alternately assume opposite reverse-locked positions, two reverse-locking operations occurring per rotor during 360° of movement thereof.

From the above, it will be seen that the rotors have equal movements during the gaseous collision event (compare, for example, Figs. 9 and 11). At other times during respective movements they differ (compare Figs. 5, 7 and 9), one moving and the other being reverse locked. A description now will be given of an improved motion differentiating mechanism, whereby these alternately equal and differing rotor movements are integrated into a substantially constant rotary movement of a power shaft.

Referring again to Fig. 1, the power shaft of the machine is numbered 87, being supported within the bearings 35 and 37 and having outside ends 89 for power take-off purposes. A central enlarged portion 91 of the shaft 87 is provided with two oppositely projecting splines 93. Flanking the splines 93 are two slightly less than semicircular slidable sleeves 95 and 97. These circularly fit the outside of the shaft, having margins 107 which abut the splines 93. The sleeve 95 has cut into it symmetrical, oppositely spiraling grooves 99 and 101. Sleeve 97 has cut into it symmetrical, oppositely spiraling grooves 103 and 105. Viewed from the right (Figs. 1, 6, 8, 10 and 12), the skew directions of the grooves 99 and 105 are righthanded, while the skew directions of the grooves 101, 103 are left-handed. Their pitch angles are preferably, though not necessarily 45°.

Pinned at 108 to the rotor A (within the sleeve 31) is a pair of oppositely located driving shoes 109 and 111. These extend into and are slidable in grooves 99 and 103, respectively. Pinned at 112 to the rotor B (within the sleeve 33) is a pair of oppositely located driving shoes 113 and 115. These extend into and are slidable in the grooves 101 and 105, respectively.

When one rotor such as B is reverse-locked and stationary, and the other, such as A, is being explosively driven, then the shoes 109 and 111 of the latter are driven to travel along the vertical plane of their pins 108. This has the effect of giving two components of movement to the half sleeve 95 as the shoe 109 presses on the forward side of the groove 99. One of these components of movement of the sleeve 95 is rotary and the other axial and to the left from the Fig. 1 position. The rotary component rotates the half sleeve 95 at one-half the speed of the rotor A. At the same time, the shoe 111 drives against the forward side of the groove 103 in half sleeve 97, thus supplying two components of motion thereto, i.e., a rotary component at half the speed of rotor A and an axial component to the right from the Fig. 1 position. During such action, the grooves 101 and 105 assume skew movements past their shoes 113 and 115, respectively. The half rotor speeds of the half sleeves 95 and 97 are transmitted to shaft 87 through splines 93.

When rotor A is reverse-locked and rotor B is being explosively driven, then the shoes 113 and 115 of the latter are driven to travel along the vertical plane of their pins 112. This has the effect of giving two components of movement to the half sleeve 95 as the shoes 113 press on the forward side of the groove 101. One of these components of movement of the sleeve 95 is then rotary and the other axial and to the right in the Fig. 1 position. The rotary component then rotates the half sleeve 95 at one-half the speed of rotor B. At the same time, the shoe 115 drives against the forward side of the groove 105 of the half sleeve 97, thus supplying two components of motion thereto, i.e., a rotary component at half the speed of rotor B and an axial component to the left from the Fig. 1 position. At this time the grooves 99 and 103 assume skew movements past their shoes 109 and 111, respectively. The half rotor speeds of the half sleeves 95 and 97 are at this time again transmitted to the shaft 87 through splines 93.

As above described, at certain periods the two rotors A and B move together as a rigid system at the same speed, i.e., when they execute their gas-buffered collision event following maximum compression and just preceding interchange of reverse-locking actions of the rotors (compare Figs. 9 and 11). During this equal velocity condition, the equal movements of both rotors are applied to the pins 108 and 112. In this event, shoes 109 and 113 are simultaneously driven against the forward sides of their grooves 99 and 101, respectively. Shoes 111 and 115 are also simultaneously driven against the forward sides of their grooves 103 and 105, respectively. Thus the wedging actions on the shoes 109 and 113 are equal and opposite relative to the half sleeve 95, and the wedging actions of the shoes 111 and 115 are equal and opposite relative to the half sleeve 97. Then neither sleeve can move axially and the full rotation of both rotors moving at equal speeds is delivered to the half sleeves 95, 97 and consequently also to the shaft 87 through splines 93. It will be clear from the above that the grooves with the followers effect cam actions which axially shuttle the half sleeves 95 and 97 oppositely back and forth on the shaft part 91. The grooves may therefore be thought of as cams, driven by the follower shoe 109, 111, 113 or 115 as the case may be.

Regarding the driving sequence from the rotors A and B to the shaft 87 through the half sleeves 95 and 97, reference will be made to the successive groups of Figs. (5, 6, 6A), (7, 8, 8A), (9, 10, 10A) and (11, 12, 12A), these groups showing a sufficient number of successive positions of parts during one power event to make the entire operation clear.

Referring to Figs. (7, 8, 8A), these illustrate the neutral relationship between parts, as also shown in Figs. 1–3. Piston G on rotor B is in the mid portion of an explosion or expansion event which started with the positions of parts shown in Figs. (5, 6, 6A). In the neutral position the half sleeves 95 and 97 are in their mid positions but sliding oppositely toward their displaced positions shown in Figs. (9, 10, 10A). The explosion occurring between pistons G and E (Figs. 7, 8, 8A) is driving the rotor B forward or anticlockwise, viewed from the right (see Fig. 8A). As rotor B moves anticlockwise from the Fig. (7, 8, 8A) position, it assumes the Fig. (9, 10, 10A) position, at which maximum compression is about to occur between pistons F and E. At this time the shoes 113 and 115 on the rotor B have cammed the half sleeves 95 and 97 axially to the right and to the left, respectively, while half the angular motion of the rotor B has been delivered to the shaft 87 from the sleeves through the splines 93.

Passage from the condition shown in Figs. (9, 10, 10A) to the condition shown in Figs. (11, 12, 12A) illustrates occurrence of the gas-buffered collision event. During this interval, in accordance with the principles above described, the rotors A and B move together at the same velocity as a connected system. No relative axial movement occurs between the half sleeves 95 and 97. All of the common angular movement of the rotors A and B is transmitted through the half sleeves 95 and 97 to the shaft 87.

The positions of parts shown in Figs. (11, 12, 12A) correspond to the initiation of an explosion event succeeding the explosion event illustrated in Figs. (5, 6, 6A). Rotor A will then be explosively driven with respect to reverse-locked rotor B and the action will be similar to that described successively for Figs. (7, 8, 8A), (9, 10, 10A) and (11, 12, 12A), except that the rotor A will advance ahead of reverse-locked rotor B and in so doing will cause the half sleeve 95 to be moved axially toward the left, and the half sleeve 97 to be moved axially toward the right until they axially realign themselves and ultimately reverse their shuttle positions. Figs. (5, 6, 6A) show conditions for the initial explosion event that occurred in the sequence illustrated. In proceeding from the Fig. (5, 6, 6A) position to the Fig. (9, 10, 10A) position, one-half of the angular velocity of rotor B is delivered to shaft 87. In proceeding through the Fig. (7, 8, 8A) positions, the half sleeves center themselves axially.

From the above, it will be evident that at the start of an expansion event such as illustrated, for example in Figs. (5, 6, 6A), the half sleeves 95 and 97 will start to shuttle. As the respective expansion event arrives at a neutral position (for example Figs. 7, 8, 8A), the sleeves 95 and 97 become centered. As the action proceeds to the next compression event (for example Figs. 9, 10, 10A), the half sleeves 95, 97 have shifted a maximum amount away from center. Then under equal movements of rotors A and B the sleeves cease to shuttle. Upon the next explosion event, as in the Fig. (11, 12, 12A) position, the sleeves 95, 97 are about to shuttle back toward their aligned neutral positions. Thus the sleeves alternately shuttle and lock. During the intervals that they shuttle, they transmit half of the rotor movement of the moving rotor to the shaft, i.e., when one rotor is reverse-locked. During the intervals that they do not shuttle, they transmit full rotor movement to the shaft. Successive shuttle directions are opposite.

The movement of rotor B from the Fig. 6A to the Fig. 10A position is 130°, and 65° of movement is transferred to the shaft 87 as the sleeves 95 and 97 shuttle. Then equal movements occur between rotors A and B during the gas-buffered collision and compression events, this movement being 25°, all of which is delivered to the shaft 87. This 25° of movement, plus the 65° already acquired, totals 90° of shaft movement. It will be observed that rotor B moves 155° from the Fig. 6A position to the Fig. 12A position, and that an additional 25° rotor B movement is required to bring rotor B to the Fig. 12A position. This accounts for the 180° rotor movement corresponding to 90° of shaft movement in one cycle of power events. During intervals that the rotors move together as a connected system, the sleeves are at maximum axial displacements in one direction or the other on shaft 87, drive the shaft at the rotor speed and do not shuttle. Since operation of the action of the differentiating means shown in Figs. 6, 8, 10, 12 has been outlined in detail for one power event, and it is essentially the same for the other three power events occurring in one complete cycle of movements, further description will not be required.

It is not to be assumed from the above that the shaft 87 varies its speed, since only ratios of displacements between it and the rotors have been referred to. Actually, enough flywheel effect is carried on the shaft 87, either by placing a flywheel thereon or by the driven parts connected therewith, that it will have a nearly constant velocity while the velocities of the rotors vary under influences of the suction, compression, explosion and exhaust events. Nevertheless, the relative displacement angles of the rotors and shaft are as above described.

While the follower shoes 109, 111, 113 and 115 have been shown as attached to the rotors and working in grooves cut into the half sleeves, it will be understood that this arrangement may be kinematically inverted, i.e., the grooves may be appropriately cut into the insides of the rotors and the follower shoes pinned to the sleeves. Thus it will be apparent that the grooves and the shoes are in effect cam means operative between the rotors and the shuttle sleeves to shuttle the latter while the driving rotors are moving relatively, said cam means being adapted to lock the shuttle sleeves against shuttle movements when the driving rotors move together, as shown in Figs. (6, 6A), (8, 8A), (10, 10A) and (12, 12A).

Summarizing, in Figs. (6, 6A) the shuttle sleeves 95 and 97 have just been unlocked and are about to partake of shuttle movements as the rotor B assumes relative movement with respect to rotor A. In Figs. (8, 8A) the relative shuttling movement is continued as rotor B continues its relative motion with respect to rotor A. In Figs. (10, 10A) the shuttling movement in one direction comes to an end, as the rotors B and A begin to lock up. In Figs. (12, 12A) the rotors have gone through their locked-up movements while the shuttle sleeves 95 and 97 have been locked up. Rotor A is then about to execute relative motion with respect to rotor B and the shuttle sleeves are about to become unlocked and execute a shuttling movement opposite to that illustrated in the Figs. (6, 6A), (8, 8A), (10, 10A) sequence.

It will be apparent that while an arrangement is shown wherein each rotor has two pistons, it would also be applicable to an arrangement wherein each of the rotors has four pistons interdigitated with one another in the cylinder, with the one complete cycle of power movements occurring throughout 90° of piston movement, rather than throughout the 180° of piston movement as herein described. This will be clear from my Patent 2,736,328, wherein the additional firing and porting means are illustrated for such an alternative.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move substantially at the same angular speed throughout a range of movements across said reverse-locking position, each set of pistons and their corresponding rotor otherwise successively moving relatively to the reverse-locked pistons and their corresponding rotor, a shaft, shuttles slidable relative to said shaft and adapted to drive it in rotation, and cam means connecting each shuttle with both rotors adapted to slide the shuttles relative to the shaft while rotating them and the shaft during relative rotor movements and to lock the shuttles relative to the shaft while rotating them and the shaft during equal rotor movements.

2. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move at substantially the same angular speed throughout a range of movements across said reverse-locking position, each set of pistons and their corresponding rotor otherwise successively moving relatively to the reverse-locked pistons and their corresponding rotor, a shaft, axially movable shuttle means splined to the shaft adapted to turn the same with the shuttle means thereon, and opposed angled cam and follower driving means connecting between the respective rotors and each shuttle means adapted to lock the rotors to the shuttle means when the rotors move together and to impart combined rotary and axial movements to the shuttle means when the rotors rotate relatively to one another.

3. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move at substantially the same angular speed throughout a range of movements across said reverse-locking position, each set of pistons and their corresponding rotor otherwise successively moving relatively to the reverse-locked pistons and their corresponding rotor, a shaft, axially slidable rotary driving shuttles on said shaft, and opposed skew driving connections between the respective rotors and each slidable shuttle adapted to lock the rotors to the shuttles when the rotors move together and to impart combined rotary and axial movements to the shuttles when the rotors rotate relatively to one another.

4. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move together at substantially the same angular speed throughout a range of movements across said reverse-locking position, each set of pistons and their corresponding rotor otherwise successively moving relatively to the reverse-locked pistons and their corresponding rotor, a shaft, shuttle members formed with rotary driving but axially sliding connections with the shaft, and skew driving connections between said respective members and the two rotors operative to impart all rotor rotation to the shaft when the rotors move together and a fraction of the relative rotor rotations when the rotors move relatively.

5. A rotary engine according to claim 4, wherein said skew driving connections with the rotors in the case of each shuttle member are oppositely and symmetrically pitched.

6. A rotary engine according to claim 5, wherein the pitch angle is 45°.

7. A rotary engine comprising a frame, a toroidal cylinder carried in said frame, a pair of relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move together at substantially the same angular speed throughout a range of movements across said reverse-locking position, each set of pistons and their corresponding rotor otherwise successively moving relatively to the reverse-locked pistons and their corresponding rotor, a shaft, a pair of partial sleeves axially splined to the shaft and adapted slidably to shuttle thereon, and skewed groove and follower driving connections between each sleeve and the respective rotors operative to impart all rotor rotation to the shaft when the rotors rotate together and a fraction of the relative rotor rotation when the rotors move relatively, and pairs of followers in the oppositely pitched grooves in each sleeve, the members of each pair being attached to the respective rotors.

8. A rotary engine according to claim 7, wherein the skewed grooves of said driving connections in the case of each sleeve are oppositely and symmetrically pitched.

9. A rotary engine according to claim 8, wherein the pitch angle is 45°.

10. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move together at substantially the same angular speed throughout a range of movements across said reverse-locking position, each set of pistons and their corresponding rotor otherwise successively moving relatively to the reverse-locked pistons and their corresponding rotor, a shaft, partial sleeves axially splined to and slidable on said shaft for opposite shuttling movements thereon, each sleeve carrying oppositely and symmetrically pitched helical grooves, and pairs of followers in the oppositely pitched grooves in each sleeve, the members of each pair of followers being attached to the respective rotors.

11. A rotary engine according to claim 10, wherein the pitch angle of said grooves is 45°.

12. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons at intervals executing gas-buffered collision events wherein they and the rotors move at the same angular speed throughout a range of movements including said reverse-locking position, certain of said pistons and their corresponding rotor between said intervals moving with respect to the other reverse-locked set of pistons and their corresponding rotor, each reverse-locking mechanism for a rotor comprising a cam track carried by the frame, an arm pivoted at one end to the rotor and carrying a follower roller at its other end engaging said cam track, and means biasing said arm to press the roller against said cam track, said cam track being shaped with inwardly and outwardly directed portions adapted to move the arm in and out as it is traversed by said roller, said arm being adapted to assume a reverse-locking position when said roller is in a position on said outwardly directed portion, the arrangement being such that the trajectory of the center of the roller when moving outward is sufficient to cause an angular movement of the pivot point of the arm on its respective rotor which exceeds the angular movements of said rotors when moving together.

13. A rotary engine according to claim 12, wherein said angular movement of the rotors when moving together is on the order of 25° and said angular movement of the pivot point is on the order of 45°.

14. A reverse-locking mechanism for a rotary engine comprising a rotor member surrounded by a cam track, an arm pinned at one end to the rotor member and carrying a cam track follower at its other end, spring means reacting between the rotor member and the arm adapted to bias said follower against the cam track, said cam track being formed with two pairs of flats adjacent ends of which are connected by a curve centered on the rotation center of the rotor member, and compound curves connecting the other adjacent ends of the flats, said arm having reverse-locking thrust positions on the flats adjacent the compound curves.

15. A reverse-locking mechanism for a rotary engine according ti claim 14, wherein each of said compound curves consists of an arc of relatively large radius centered on a line parallel to one pair of flats, and an arc of smaller radius centered off of said line.

16. A reverse-locking mechanism for a rotary engine comprising a rotor member surrounded by a cam track, an arm pinned at one end to the rotor member and carrying a cam track follower at its other end, spring means reacting between the rotor member and the arm adapted to bias said follower against the cam track, said cam track being formed with two pairs of flats adjacent ends of which are connected by a curve centered on the rotation center of the rotor member, opposite flats being parallel, and compound curves connecting the other adjacent ends of the flats, said arm having reverse-locking thrust positions on the flats adjacent the compound curves.

17. A reverse-locking mechanism for a rotary engine comprising a rotor member surrounded by a cam track, an arm pinned at one end to the rotor member and carrying a cam track follower at its other end, said arm being curved partially around the rotor member, spring means reacting between the rotor member and the arm adapted to bias said follower against the cam track, said cam track being formed with two pairs of flats adjacent ends of which are connected by a curve centered on the rotation center of the rotor member, opposite flats being parallel, the members of each pair of flats being symmetrically disposed, and compound curves connecting the other adjacent ends of the flats, said arm having reverse-locking thrust positions of the flats adjacent the compound curves.

18. A reverse-locking mechanism for a rotary engine according to claim 17, wherein each of said compound curves consists of an arc of relatively large radius centered on a line parallel to one pair of flats, and an arc of smaller radius centered off of said line.

19. A reverse-locking mechanism for a rotary engine comprising a rotor member surrounded by a cam track, two arms respectively pinned oppositely on the rotor member and carrying cam track followers at their outer ends, said arms being curved partially around the rotor member, spring means reacting between the rotor member and the arms adapted to bias said followers against the cam track respectively, said cam track being formed with two pairs of flats adjacent ends of which are connected by a curve centered on the rotation center of the rotor member, opposite flats being parallel, the members of each pair of flats being symmetrically disposed, and compound curves connecting the other adjacent ends of the flats, said arms having reverse-locking thrust positions on the flats adjacent the compound curves.

20. A reverse-locking mechanism for a rotary engine according to claim 19, wherein each of said compound curves consists of an arc of relatively large radius centered on a line parallel to one pair of flats, and an arc of smaller radius centered off of said line.

21. A rotary engine comprising a frame, a toroidal cylinder carried in said frame, relatively movable rotors having interdigitated pistons in the cylinder, reverse-locking mechanisms operative between said rotors and the frame adapted successively to reverse-lock the rotors at a certain angular position in the frame, said pistons executing gas-buffered collision events wherein they and the rotors move substantially at the same angular speed throughout a range of movements across said reverse-locking position, each set of pistons and their corresponding rotor otherwise successively moving relatively to the reverse-locked pistons and their corresponding rotor, a shaft, shuttles axially slidable relative to said shaft and adapted to drive it in rotation, and cam means connecting each shuttle with both rotors adapted to slide the shuttles axially relative to the shaft while turning them and the shaft with half the angular displacement of the moving rotor during relative rotor movements and to lock the shuttles relative to the shaft while turning them and the shaft with angular displacement equal to that of the equal rotor movements.

22. A rotary engine according to claim 21, wherein each cam means is constituted by a follower cooperating with a groove means.

No references cited.